United States Patent [19]

Henderson

[11] 4,025,312
[45] May 24, 1977

[54] APPARATUS FOR MAKING CARBON BLACK

[75] Inventor: Eulas W. Henderson, Oregon, Ohio

[73] Assignee: Phillips Petroleum Company, Bartlesville, Okla.

[22] Filed: Jan. 27, 1976

[21] Appl. No.: 652,694

[52] U.S. Cl. .............................. 23/259.5; 23/277 R; 423/456; 423/450

[51] Int. Cl.² ................... C01B 49/00; C09C 1/48; C10B 47/00

[58] Field of Search ...................... 23/259.5, 277 R; 423/456, 450

[56] References Cited

UNITED STATES PATENTS 2,790,838   4/1957   Schrader .................... 23/259.5 UX
3,256,066   6/1966   Higgins ........................ 23/259.5

Primary Examiner—James H. Tayman, Jr.

[57] ABSTRACT

An apparatus for producing carbon black in which an outer housing has mounted therein a tube which defines a converging/diverging venturi through which hot combustion gases and oil flow for decomposition of the oil to carbon black. The tube has an upstream open end at which position there is a baffle having a through opening which has a diameter smaller than the diameter of the open end of the tube, thereby forming a choke at the upstream end of the tube. The apparatus is also provided with means for introducing fuel or fuel gas, air or oxygen-containing gas and feed oil at the proper positions for the manufacture of carbon black.

8 Claims, 1 Drawing Figure

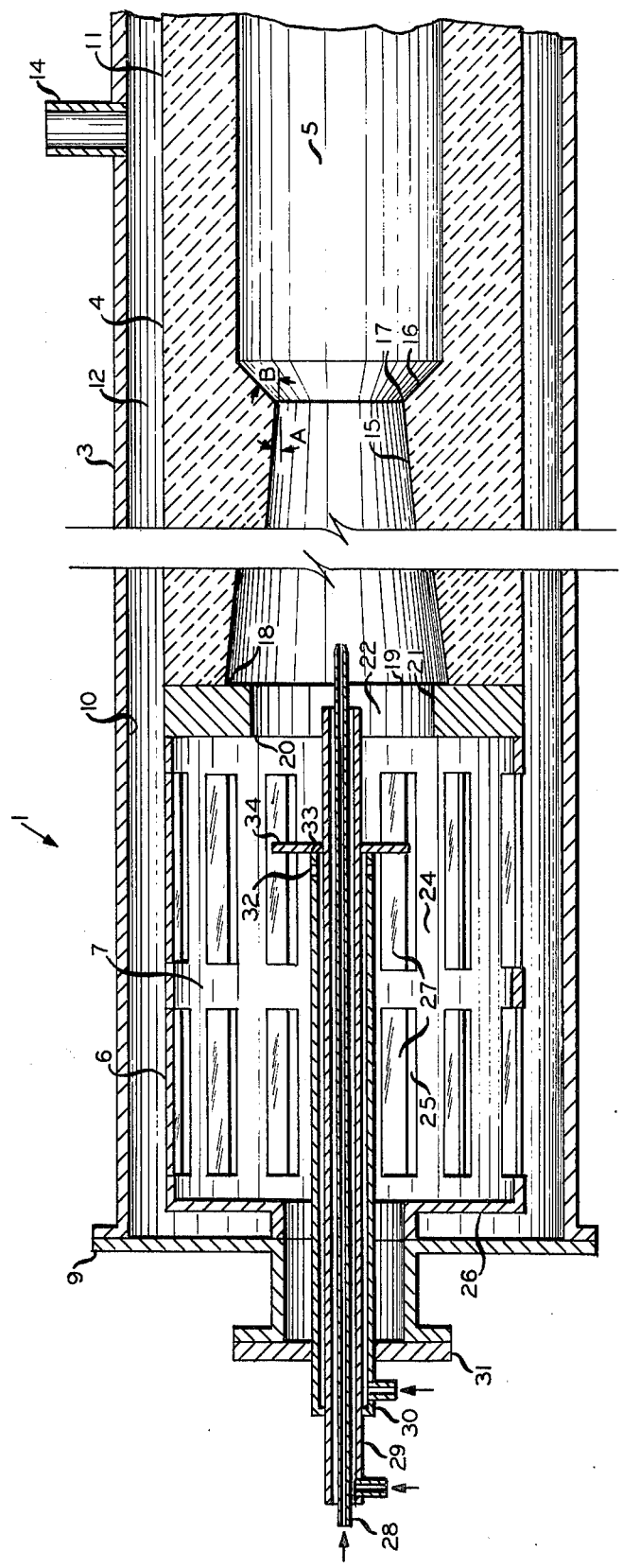

APPARATUS FOR MAKING CARBON BLACK

In the art of manufacturing carbon black, many apparatuses are known for producing carbon black and system objectives are to develop and use a more efficient apparatus, i.e., one which will produce more carbon black with less fuel and oil. The present invention provides a modification to a carbon black reactor which by tests has been shown to produce more carbon black with less air and less fuel while using the same amount of feed oil. The reason for this is not fully understood, but the test results show such an improvement.

The principal objects and advantages of the present invention are: to provide an apparatus for producing carbon black which when operated produces more carbon black than other apparatuses which do not use the invention described herein; to provide such an apparatus which will produce more carbon black on less air and fuel gas for a given quantity of feed oil; and, to provide such an apparatus which is simple in construction and effective in operation and well adapted for its intended use.

Other objects and advantages of the present invention will become apparent from the following description taken in connection with the accompanying drawings wherein are set forth by way of illustration and example certain embodiments of the present invention.

FIG. 1 is a fragmentary sectional view of an apparatus for producing carbon black.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in any appropriate detailed structure.

The reference numeral 1 designates generally an apparatus for the production of carbon black in which a make-oil or feed oil is fed to the apparatus 1 and is decomposed or carbonized by heating with a burning mixture of fuel gas and air. Such processes are well known in the art of carbon black production and need not be further described herein. The apparatus 1 in the illustrated structure includes a housing 3 which has suitably mounted therein a member 4 which has a through passage 5 in which the oil is decomposed. Means 6 are provided which defines a precombustion zone 7 in which combustion of the fuel gas takes place while same is being mixed with air which is suitably introduced into the apparatus 1. The apparatus 1 also includes means for introducing the make-oil and fuel gas into preselected areas of the apparatus 1.

In the illustrated structure the housing 3 is generally cylindrical in shape and is elongate and can be made of a material such as steel and has an end 9 which is closed. The housing 3 has an interior surface 10 which in the illustrated structure is spaced from an exterior surface 11 of the member 4 with the surfaces forming an annular flow path 12 through which air flows to the precombustion zone 7. Air is introduced into the flow path 12 as, for example, by an air inlet 14. This allows preheating of the air before same enters the precombustion zone 7.

In the illustrated structure, the member 4 can be of any suitable refractory material with the passage 5 therethrough being a converging/diverging venturi arrangement having a converging section 15 and a diverging section 16 with a throat 17 therebetween. The member 4 can be mounted in the housing 3 in any suitable manner and has an upstream open end 18 with an opening 19 having a preselected diameter and having a generally circular cross section. The open end 18 is spaced a preselected distance from the end 9 as is dictated by the particular operating conditions and desired end results.

The converging zone 15 of the venturi can have an angle A in the range of 1° to 20°, and an angle B in the diverging zone of 2° to 50°.

A member 20 is positioned immediately adjacent to and upstream of the open end 18 and is mounted in that position in any suitable manner such as by securement to the member 4. As shown, the member 20 has a surface 21 which defines a through opening 22 which forms a flow path between the precombustion zone 7 and the passage 5. The opening 22 has a size smaller than the opening 19 as, for example, preferably the opening 22 is 40 percent to 90 percent of the diameter of the opening 19. Also, the surface 21 has an axial length of up to approximately 50 percent of the diameter of the opening 22. The member 20 provides a choke at the entrance to the opening 19 and actual runs have shown that the use of the choke will result in the production of more carbon black for a given amount of feed oil, using less air and fuel gas as is shown in Table I produced below. The member 20 can be of any suitable metal or refractory material which will withstand the temperature of the interior of the apparatus 1. It is to be noted that although a generally cylindrical opening 22 is shown, the opening can be of any suitable contour, such as a knife edge or rounded contour, for the surface 21.

Means is provided to define the precombustion zone 7 and, as shown, the means 6 includes a perforate cage 24 suitably mounted within the apparatus 1 adjacent the end 9 with the cage 24 having a plurality of openings communicating between the flow path 12 and the interior of the cage 24. As shown, the cage 24 has a plurality of openings 25 and is generally cylindrical in shape and extends from the member 20 to a position adjacent the end 9 and has the upstream end 26 thereof closed. It is desirable to introduce air into the precombustion zone 7 in a tangential manner so as to form a vortex-type flow within the precombustion zone and, as such, baffles or deflectors 27 are positioned adjacent each of the openings 25 whereby the direction of flow of preheated air in 12 is changed and deflected to form the vortex flow within the precombustion zone 7.

As described above, means is provided for introducing fuel gas and feed oil into the apparatus 1 and in the illustrated structure the means includes coaxially positioned tubes suitably carried by portions of the apparatus 1. As shown, an oil introduction tube 28, which can have an outlet nozzle, is coaxially positioned within an oil tube cooling air introduction tube 29 which in turn is coaxially positioned within a fuel gas introduction tube 30, with the tubes preferably being axially moveable so as to position the ends thereof in a predetermined position within the precombustion zone and/or passage 5. The position of the ends of the tubes will be dictated by the particular process being carried out within the apparatus 1. As shown, the tube 30 is slidably received within a support 31 which is secured to the end 9. As shown, the tube 30 has a plurality of circumferentially spaced fuel outlet openings 32 adjacent an end 33 thereof. Also, the tube 30 has a baffle 34 secured to the end 33 thereof. The tubes 28, 29 and 30 are preferably in axial alignment with the passage 5.

Table I is produced herebelow:

Table I

|  | Invention Run | Base Run |
|---|---|---|
| Oil, gal/hr (BMCI 100) | 243 (0.93 m³/hr) | 238 (0.92 m³/hr) |
| Air/Oil, SCF/gal | 581 (4.3 m³/liter) | 667 (5.0 m³/liter) |
| Air/Gas (CH₄), SCF/SCF, volume ratio, | 15.3 | 15.0 |
| Total Air, SCF/hr | 141,090 (4000 m³/hr) | 158,694 (4450 m³/hr) |
| Carbon Black Yield No./gal of oil feed, | 4.20 (504 gm/liter) | 3.77 (452 gm/liter) |
| DBP, cc/100 gm (24M4)$^{(a)}$ | 98.3 | 100.5 |
| CTAB, m²/gm$^{(b)}$ | 89.6 | 92.2 |

$^{(a)}$DBP, 24M4, U.S. Pat. No. 3,548,454 as measured, after crushing, by Method B, ASTM D-2414-70.
$^{(b)}$CTAB as detailed in Janzen, J. and Draus, G., Rubber Chem. and Tech., 44, 1287 (1971).

The specific apparatus used to obtain the above data had the following structural features:

| | | |
|---|---|---|
| Angle A, degrees, | 2 | |
| Angle B, degrees, | 45 | |
| Opening 18, diameter, inches, | 10 | 25.4 cm. |
| Opening 20, diameter, inches, | 8 | 20.3 cm. |
| Length 20, inches, | 3 | 7.6 cm. |
| Total Length Converging Zone, inches, | 51 | 129.5 cm. |
| Throat diameter, inches | 6 | 15.2 cm. |
| Diverging Zone length, inches, | 2 | 5.1 cm. |
| Diameter Downstream of Diverging Zone, inches, | 10 | 25.4 cm. |
| Diameter of Means 4, inches, | 14 | 35.6 cm. |
| Length of Burner Cage, inches, | 20 | 50.8 cm. |
| Diameter of Cage, inches, | 14 | 35.6 cm. |
| Diameter of Means 3, inches, | 20 | 50.8 cm. |
| Oil Tube Outlet Downstream of Gas Baffle, inches, | 14 | 35.6 cm. |
| Gas Baffle Upstream of Opening 20, inches, | 8 | 20.3 cm. |

The above data was obtained using the similar reactors with the only difference between the two being that a member 20 was provided for the data in the column entitled "Invention Run". The data illustrates that for a given quantity of feed oil, less air and less fuel gas is required to produce a higher amount of carbon black with substantially the same properties, namely, DBP and CTAB. It is to be pointed out here that other arrangements of precombustion zones 7 could be used as, for example, a tangential type precombustion zone as is known in the art and as illustrated in U.S. Pat. No. 2,564,700.

It is to be understood that while I have illustrated and described certain forms of my invention, it is not to be limited to the specific form or arrangement of parts herein described and shown.

What is desired to be secured by Letters Patent is:

1. An apparatus for producing carbon black, said apparatus including:
   a. an elongate housing;
   b. a first member mounted in said housing and forming a converging/diverging venturi, said member having an upstream end;
   c. first means forming a precombustion chamber in said housing adjacent to and upstream of said upstream end;
   d. air inlet means communicating with said precombustion chamber operable for introducing air generally tangentially into the precombustion chamber;
   e. second means communicating with said precombustion chamber and operable to introduce a combustible fuel thereinto;
   f. a first tubular member extending axially into said precombustion zone and operable for introducing feed oil into one of said precombustion chamber and said venturi; and
   g. a second member positioned in said housing adjacent said upstream end, said second member having a through opening providing an upstream opening for the first member and thereby providing flow communication between said precombustion chamber and said venturi whereby air and the fuel flow from the precombustion zone through the opening into the venturi, said opening being smaller than the upstream end of said venturi and said second member and said first member cooperating with one another for preventing flow of fluid into the upstream end of the venturi except through said opening.

2. The apparatus as set forth in claim 1 wherein:
   a. said through opening being substantially round and having a diameter of approximately 40 percent to 90 percent of the diameter of the upstream end.

3. The apparatus as set forth in claim 2 wherein:
   a. an exterior portion of a portion said first member being spaced from an interior portion of said housing and forming an annular space therebetween wherein said annular space forms a portion of said air inlet means.

4. The apparatus as set forth in claim 3 wherein:
   a. said first means includes a perforate member mounted in said housing and extending upstream from said second member, said perforate member having a side wall with a plurality of through perforations, said side wall being spaced from an interior portion of said housing forming a portion of said air inlet means; and
   b. said second means includes a plurality of tubular members extending into said perforate member with said tubular members being coaxial with said first tubular member.

5. The apparatus as set forth in claim 4 wherein:
   a. said tubular members and said first tubular member being coaxial with one another and in axial alignment with said venturi.

6. The apparatus as set forth in claim 5 wherein:
   a. said tubular members including second and third tubular members with said second tubular member being adapted for introducing air and has said first tubular member extending therethrough, said third tubular member being operable for introducing the combustible gas and has said first and second tubular member extending therethrough.

7. The apparatus as set forth in claim 2 wherein:
   a. said second member having a surface defining said opening with said surface having an axial length of up to approximately 50 percent of the diameter of the opening.

8. An apparatus for producing carbon black, said apparatus including:

a. an elongate housing having a side wall and an end wall;

b. a first member mounted in said housing and having a through flow passage therethrough extending between an upstream end and a downstream end, said flow passage having a converging/diverging venturi therein with the upstream converging portion having an angle (A) of about 1 to 20 degrees and the diverging portion having an angle (B) of about 2 to 50 degrees;

c. a generally cylindrical cage mounted in said housing between said end wall and the upstream end of the first member, said cage defining a precombustion chamber therein and having a side wall with a plurality of through perforations, said cage side wall being spaced from said housing side wall forming a flow path therebetween communicating with said precombustion chamber through said perforations;

d. first means communicating with said flow path operable for introducing air thereinto;

e. injection means extending axially into said cage operable for introducing a combustible fuel into said precombustion chamber and introducing make-oil into one of said precombustion chamber and said flow passage; and f. a second member positioned in said housing between said cage and said first member upstream end, said second member having a through generally round opening providing an upstream opening for the flow passage and thereby providing flow communication between said precombustion chamber and said flow passage whereby air and fuel flow from the precombustion chamber through the opening into the flow passage, said opening being smaller than the upstream end of the flow passage with the diameter being approximately 40 percent to 90 percent of the diameter of the upstream end of the flow passage, said second member and said first member cooperating with one another for preventing flow of air from the flow path into the upstream end of the flow passage except through said opening.

* * * * *